(12) United States Patent
Rodriguez et al.

(10) Patent No.: US 7,172,305 B2
(45) Date of Patent: Feb. 6, 2007

(54) MAGNIFIER HAVING SLIDEABLY MOUNTED CAMERA

(75) Inventors: Carlos M. Rodriguez, Palm Harbor, FL (US); Waldemar H. Tunkis, Palm Harbor, FL (US); Todd Conard, Ruskin, FL (US); Patrick Murphy, Riverview, FL (US); Ronald Joseph Dean, Riverview, FL (US); Bradley S. Davis, Largo, FL (US); Michael Goldenberg, Melbourne, FL (US)

(73) Assignee: Freedom Scientific, Inc., St. Petersburg, FL (US)

( * ) Notice: Subject to any disclaimer, the term of this patent is extended or adjusted under 35 U.S.C. 154(b) by 0 days.

(21) Appl. No.: 11/308,298

(22) Filed: Mar. 15, 2006

(65) Prior Publication Data

US 2006/0268569 A1    Nov. 30, 2006

Related U.S. Application Data

(60) Provisional application No. 60/595,003, filed on May 26, 2005.

(51) Int. Cl.
*G02B 27/02* (2006.01)

(52) U.S. Cl. .................... 362/97; 362/98; 349/200; 359/802

(58) Field of Classification Search ............ 362/97, 362/98; 349/64, 200; 345/4, 589; 382/313; 359/802
See application file for complete search history.

(56) References Cited

U.S. PATENT DOCUMENTS 3,816,646 A    6/1974 Cinque

| 4,928,170 | A | | 5/1990 | Soloveychik et al. |
| 5,168,405 | A | * | 12/1992 | Feinbloom ............ 359/802 |
| 5,325,123 | A | | 6/1994 | Bettinardi |
| 5,633,674 | A | | 5/1997 | Trulaske et al. |
| 5,729,283 | A | | 3/1998 | Meyer et al. |
| 5,748,228 | A | | 5/1998 | Kobayashi et al. |
| 5,959,605 | A | | 9/1999 | Gilblom |
| 6,295,390 | B1 | * | 9/2001 | Kobayashi et al. ......... 382/313 |

(Continued)

FOREIGN PATENT DOCUMENTS

JP        09238232 A      9/1997

(Continued)

*Primary Examiner*—Renee Luebke
*Assistant Examiner*—Mary Zettl
(74) *Attorney, Agent, or Firm*—Ronald E. Smith; Smith & Hopen, P.A.

(57) ABSTRACT

A magnifier for use by people with low vision includes a large LCD display upon which an enlarged image appears. Light from an LED is directed in a first direction onto a deflection wall where it is deflected into a direction substantially orthogonal to the first direction. The deflected light impinges upon a diffuser that bends it so that it illuminates an object upon which the magnifier is placed. The light is then reflected by the object, through the diffuser, and onto a mirror positioned at an angle relative to the object. The mirror directs the light onto a camera lens and the lens focuses the light onto a sensor that drives the LCD display so that the image appears on the LCD screen. The camera is slideably mounted so the user can make the image larger or smaller by sliding the camera toward or away from the mirror, respectively.

10 Claims, 2 Drawing Sheets

U.S. PATENT DOCUMENTS

| | | |
|---|---|---|
| 6,731,326 B1 | 5/2004 | Bettinardi |
| 6,791,600 B1 | 9/2004 | Chan |
| D503,732 S | 4/2005 | Hogrebe et al. |
| 6,907,390 B1 | 6/2005 | Reffner et al. |
| 6,912,301 B1 | 6/2005 | Lin et al. |
| 6,956,616 B2 | 10/2005 | Jung et al. |
| 2001/0019662 A1 | 9/2001 | Shono |
| 2002/0008905 A1* | 1/2002 | Bellefuil .............. 359/407 |
| 2002/0145813 A1 | 10/2002 | Jung et al. |
| 2004/0189847 A1 | 9/2004 | Hogrebe et al. |
| 2004/0246340 A1 | 12/2004 | Sukenari et al. |
| 2005/0024530 A1 | 2/2005 | Schuttinger |
| 2005/0062847 A1 | 3/2005 | Johnston |
| 2005/0122396 A1 | 6/2005 | Mizukami et al. |
| 2005/0162512 A1 | 7/2005 | Seakins |
| 2006/0092170 A1* | 5/2006 | Bathiche et al. ............ 345/589 |

FOREIGN PATENT DOCUMENTS

| | | |
|---|---|---|
| JP | 09322045 A | 12/1997 |
| JP | 11225328 A | 8/1999 |
| JP | 2003348418 A | 5/2003 |
| JP | 2004364126 A | 12/2004 |
| WO | 03083805 A1 | 10/2003 |

* cited by examiner

MAGNIFIER HAVING SLIDEABLY MOUNTED CAMERA

CROSS REFERENCE TO RELATED APPLICATIONS

This application claims priority to U.S. Provisional Patent Application No. 60/595,003, entitled: "Portable Electronic Magnifier," filed by the same inventors on May 26, 2005.

BACKGROUND OF THE INVENTION

1. Field of the Invention

This invention relates, generally, to magnification devices for people with low vision. More particularly, it relates to a portable magnification device that is placed a fixed distance from an object to be magnified.

2. Description of the Prior Art

Conventional magnifiers for use by people with low vision are heavy and cumbersome to use. Some conventional magnifiers are hard to use because a user must hold them in spaced relation to the object being magnified.

Other conventional magnifiers are easier to use because they need not be held all the time but the user must adjust the height thereof to provide the desired amount of magnification. The device thus has a high profile when the amount of magnification is high and a lower profile when the amount of magnification is lessened.

What is needed, then, is a magnifier that is not held by a user above the object being magnified. There is also a need for a portable magnifier that has a low profile at all times and which does not need to be raised and lowered as the amount of magnification is adjusted.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for a means for a portable magnifier that has a constant, low profile is now met by a new, useful, and non-obvious invention.

The novel magnifier includes a top wall having an opening formed therein. An LCD display is mounted in the opening formed in the top wall. A plurality of sidewalls is mounted about a periphery of and depends a common distance from the top wall. Each sidewall of the plurality of sidewalls has a smooth bottom edge so that the magnifier is adapted to sit atop an object to be magnified and to be slideably moved with respect to the object with a low friction interface between the smooth bottom edges and the object;

A light source adapted to emit light forms a part of the magnifier as well. Further parts of the magnifier include a light guide that guides light emitted by the light source, and a diffuser mounted in parallel relation to the object. The diffuser is mounted on the magnifier a fixed distance from the object.

The light guide is adapted to guide light from the light source along a path of travel where the light travels substantially parallel to the diffuser. The uneven surface of the diffuser bends the light so that it passes through the diffuser a first time and impinges upon an object.

A mirror is mounted at a predetermined angle in spaced relation to the object so that light reflected from the object travels through the diffuser a second time, in an opposite direction relative to the first time, and impinges upon the mirror. The angle of the mirror changes the path of travel of the light from a vertical, upward path of travel to a horizontal path of travel.

A camera lens is mounted in light-capturing relation to light reflected by the mirror. A sensor is mounted behind the camera lens to receive light that is captured by the camera lens. The sensor is in electrical communication with the LCD display so that images focused onto the sensor by the camera lens are displayed on the LCD display. The images are substantially larger than the images on said object.

An important advantage of the novel portable magnifier is that it has a low profile and slides easily over any flat object to be magnified.

Another important advantage is that the profile of the magnifier is fixed, there being no need to adjust the height of the magnifier to achieve differing amounts of magnification.

Another advantage lies in the ability of the magnifier to provide greater magnification by sliding a camera in a horizontal plane in a first direction and less magnification by sliding the camera in a horizontal plane in a second direction opposite to said first direction.

These and other advantages will become apparent as this disclosure proceeds. The invention includes the features of construction, arrangement of parts, and combination of elements set forth herein, and the scope of the invention is set forth in the claims appended hereto.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
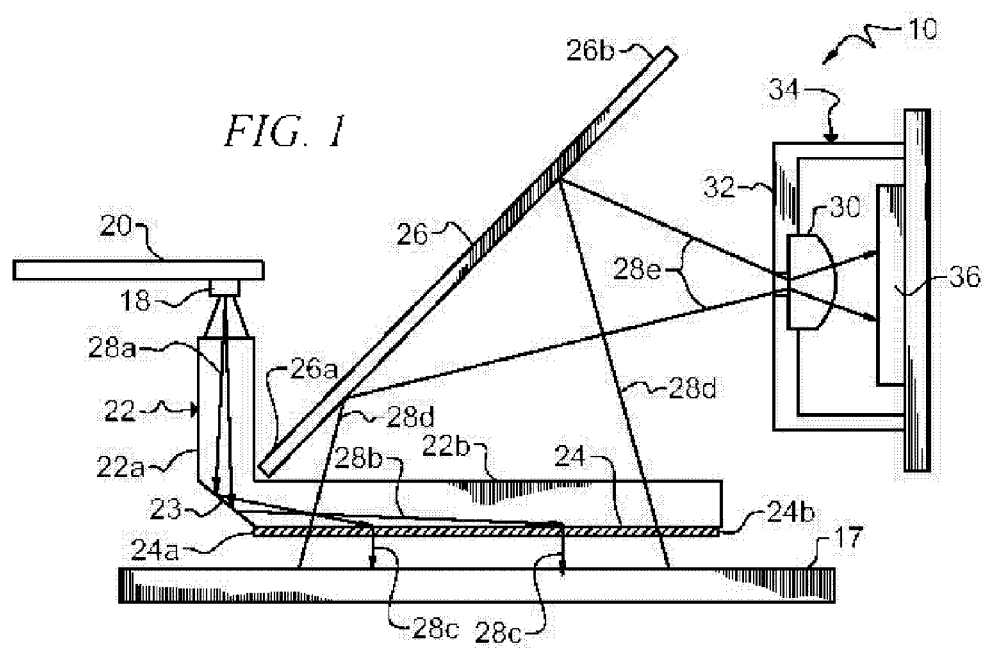
FIG. 1 is a diagrammatic side elevational view depicting the essential parts of the novel magnifier.
Figure 2:
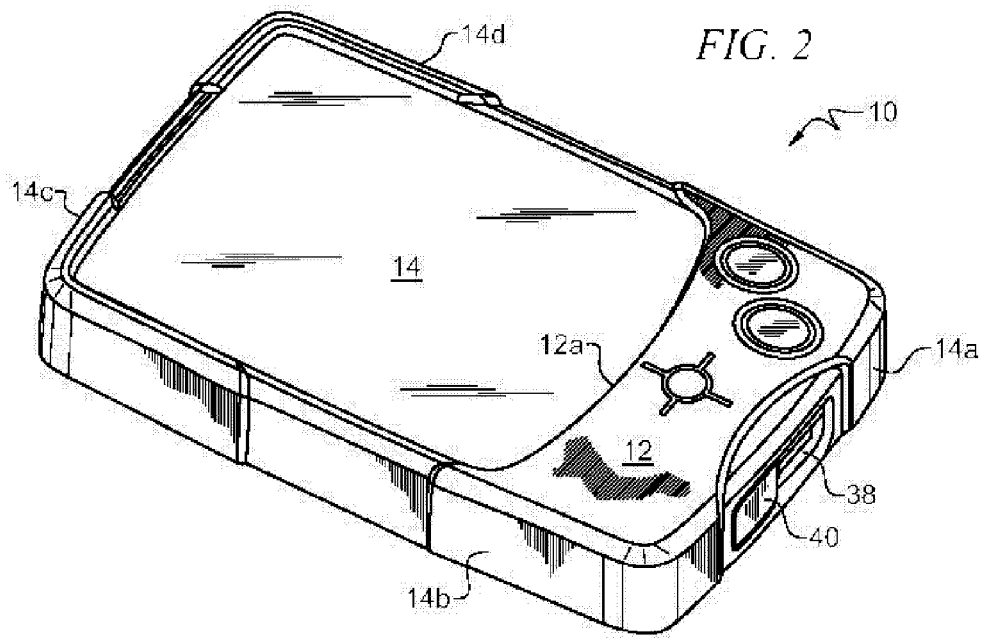
FIG. 2 is a top perspective view of the magnifier housing in its fully assembled configuration.

Referring now to FIGS. 1–4, it will there be seen that an illustrative embodiment of the invention is denoted as a whole by the reference numeral 10.

Magnifying device 10 has a hollow, box-like structure. Top wall 12 has an opening 12a formed therein within which is mounted LCD display 14. Bottom wall 13 is transparent and is disposed parallel to top wall 12. Sidewalls 14a, 14b, 14c, and 14d interconnect top wall 12 and bottom wall 13. Bottom wall 13 is placed atop an object 17 to be magnified. Bottom wall 13 is smooth so that magnifying device 10 can slide atop object 17 with low frictional resistance as the user of the device uses it to read a page of text, for example.

Bottom wall 13 can be eliminated. In such an embodiment, the respective bottom edges of sidewalls 14a–d would be smooth so that they could slide over object 17 with low frictional resistance. However, dirt or other debris could enter into the hollow interior of magnifier 10 if bottom wall 13 is not employed.

A light emitting diode (LED) 18 is mounted to printed circuit board (PCB) 20 that is mounted to top wall 12 in underlying relation thereto. The PCB is positioned in a plane parallel to the plane of object 17 and the light emitted by the LED is perpendicular to the plane of said object. Light guide 22 has a vertical part 22a and a horizontal part 22b disposed at a right angle to one another. Deflection wall 23 provides transition from the vertical part to the horizontal part of the light guide.

Diffuser 24 is a light turning film and is mounted in underlying relation to horizontal part 22b of light guide 22. Diffuser 24 is therefore parallel to object 17. Significantly, the vertical spacing between object 17 and diffuser 24 is fixed. The proximal end of diffuser 24 is denoted 24a and the distal end thereof is denoted 24b.

Mirror 26 has a first, lower end 26a positioned close to the juncture of the vertical and horizontal parts 22a, 22b of light guide 22 and a second, upper end 26b positioned above the plane of PCB 20 and substantially coincident with distal end 24b of said diffuser 24. Accordingly, mirror 26 extends substantially the entire transverse extent of diffuser 24.

Light 28a traveling downwardly from LED 18 bounces off deflection wall 23 and travels thereafter as light 28b. Light 28b travels substantially parallel to diffuser 24 in a horizontal path of travel until the uneven, rough top surface of diffuser 24 bends said light 28b so that said light passes through diffuser 24 a first time as at 28c in a downward, first direction and illuminates object 17. Light 28d is then substantially vertically reflected from object 13 and said light 28d passes through diffuser 24 a second time in an upward direction opposite to said first direction after reflecting from said object and impinges upon mirror 26 and is deflected by said mirror so that it travels substantially horizontally as at 28e.

Camera lens 30 is mounted in front wall 32 of camera 34 and said camera lens 30 focuses light 28e onto sensor 36. An image captured by said sensor is transmitted to LCD display 14 in magnified form so that a low vision user may be able to read the image appearing on said LCD display 14.

Figure 3:
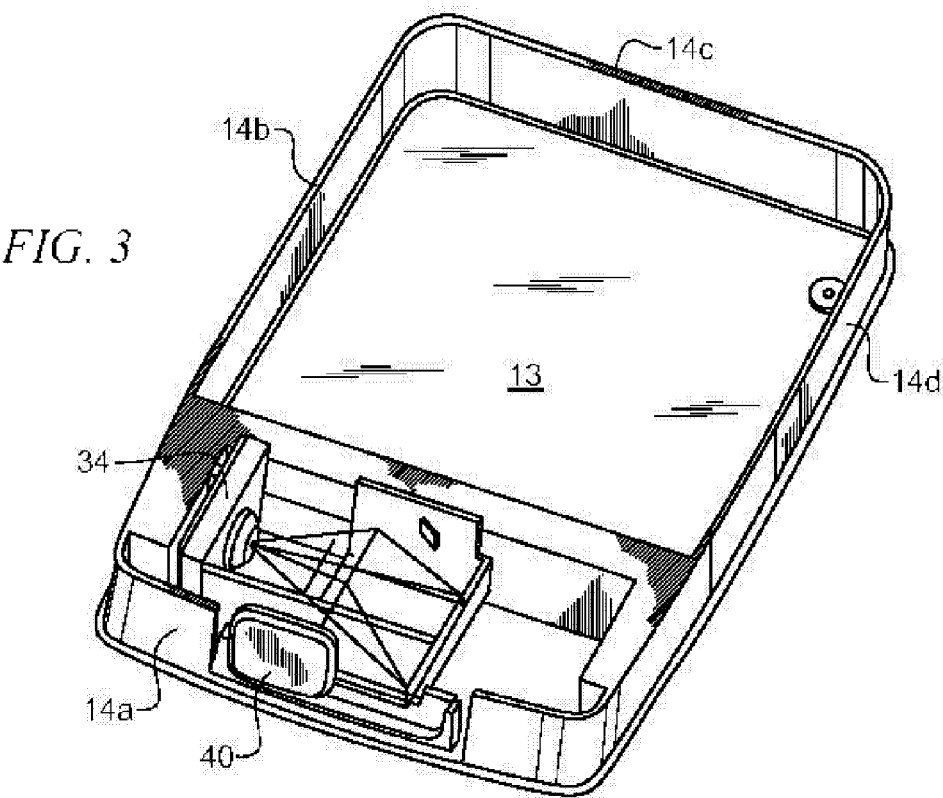
FIG. 3 is a bottom perspective view depicting the camera in remote relation to the mirror.
Figure 4:
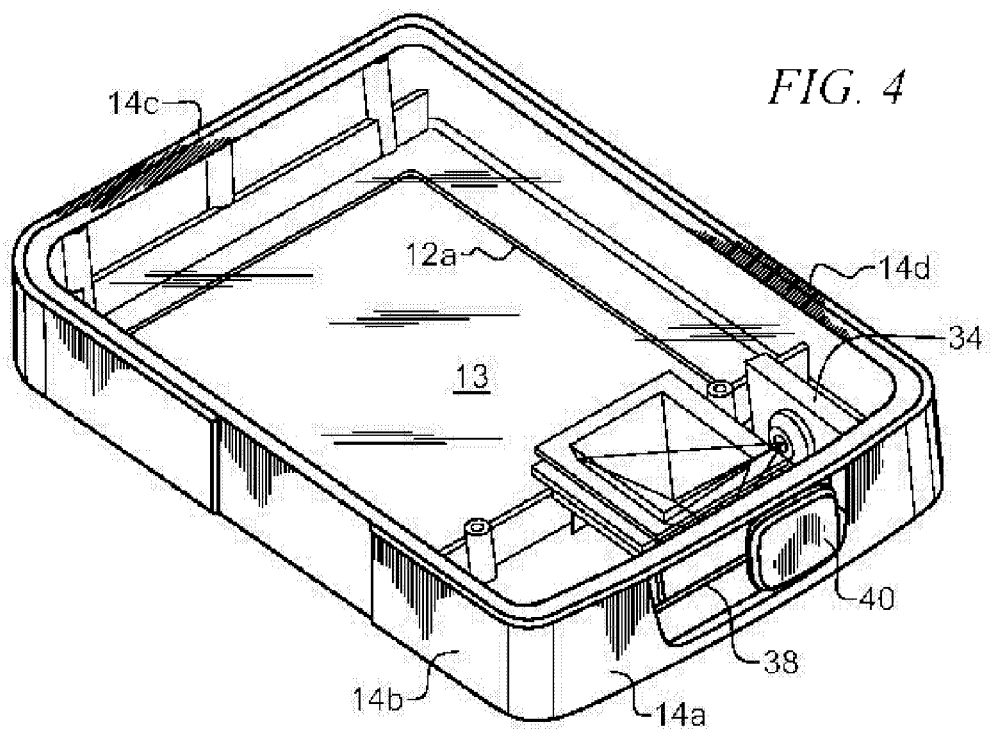
FIG. 4 is a bottom perspective view depicting the camera is closer proximity to the mirror than in FIG. 3.

As best understood in connection with FIGS. 3 and 4, camera 34 is slideably mounted within the hollow interior of magnifier 10. Horizontally extending slot 38 is formed in sidewall 14a and said slot receives an arm, not depicted, that is formed integrally with slide actuator 40. Thus it is understood that slide actuator 40 has an internal part connected to camera 34 and an external part that is slideable within slot 38 by a user, and that said arm interconnects the internal part and the external part. Said undepicted arm is directly or indirectly connected to camera 34 so that user-controlled sliding of slide actuator 40 effects simultaneous and corresponding movement of said camera. Sliding the camera towards mirror 26 enlarges the image on LCD screen 14 and sliding the camera away from said mirror has the opposite effect.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A magnifier for use by people with low vision, comprising:
    a hollow housing;
    said hollow housing including a top wall having an opening formed therein;
    an LCD display mounted in said opening;
    said hollow housing including a transparent bottom wall;
    a plurality of sidewalls interconnecting said top wall and said bottom wall;
    said transparent bottom wall adapted to rest atop an object to be magnified and to be slideably moved with respect to said object with a low friction interface between said transparent bottom wall and said object;
    a light source adapted to emit light;
    a light guide that guides light emitted by said light source;
    a diffuser mounted in parallel relation to said object;
    said diffuser being a fixed distance from said object;
    said light guide adapted to guide light from said light source into a horizontal path of travel where said light travels substantially parallel to a rough top surface of said diffuser until said light is bent by and passes through said diffuser a first time in a first downward direction so that said light is adapted to impinge upon said object;
    a mirror mounted at a predetermined angle in spaced relation to said object so that light reflected from said object travels through said diffuser a second time in an upward direction opposite to said first downward direction after reflecting from said object and impinges upon said mirror;
    a camera lens mounted in light-capturing relation to light reflected by said mirror;
    a sensor for receiving light that is captured by said camera lens;
    said sensor being in electrical communication with said LCD display so that images focused onto said sensor by said camera lens are displayed on said LCD display, said images being substantially larger than the images on said object.

2. The magnifier of claim 1, further comprising:
    said camera lens being slideably mounted with respect to said mirror so that said camera lens can be positioned in close proximity to said mirror or away from said mirror, or any position therebetween so that the amount of magnification is controlled by the position of the camera.

3. The magnifier of claim 2, further comprising:
    a slide actuator mounted in sliding relation to said housing;
    said slide actuator having an internal part connected to said camera lens;
    said slide actuator having an external part positioned external to said housing so that a user may control the position of said camera lens by sliding said external part of said slide actuator with respect to said housing;
    a slot formed in said housing; and
    said internal part of said slide actuator being connected to said external part of said slide actuator through said slot.

4. The magnifier of claim 1, further comprising:
    said light guide having a transparent construction.

5. The magnifier of claim 4, further comprising:

said light guide having a vertical part, a horizontal part, and a deflector wall disposed between said vertical and horizontal parts at a substantially forty-five degree angle.

6. The magnifier of claim 5, further comprising:

said light source being in open communication with said vertical part of said light guide;

said deflector wall operative to direct light from said light source into said horizontal part of said light guide.

7. The magnifier of claim 6, further comprising:

said diffuser being disposed between said horizontal part of said light guide and said transparent bottom wall.

8. A magnifier for use by people with low vision, comprising:

a hollow housing;

said hollow housing including a top wall having an opening formed therein;

an LCD display mounted in said opening;

said hollow housing including a transparent bottom wall;

a plurality of sidewalls interconnecting said top wall and said bottom wall;

said transparent bottom wall adapted to rest atop an object to be magnified and to be slideably moved with respect to said object with a low friction interface between said transparent bottom wall and said object;

a light source adapted to emit light;

a light guide that guides light emitted by said light source;

a diffuser mounted in parallel relation to said object;

said diffuser being a fixed distance from said object;

said light guide adapted to guide light from said light source into a path of travel where said light travels substantially parallel to said diffuser so that said light is bent by and passes through said diffuser a first time in a first direction so that said light is adapted to impinge upon said object;

a minor mounted at a predetermined angle in spaced relation to said object so that light reflected from said object travels through said diffuser a second time in a direction opposite to said first direction and impinges upon said mirror;

a camera lens mounted in light-capturing relation to light reflected by said mirror;

a sensor for receiving light that is captured by said camera lens;

said sensor being in electrical communication with said LCD display so that images focused onto said sensor by said camera lens are displayed on said LCD display, said images being substantially larger than the images on said object;

said camera lens being slideably mounted with respect to said mirror so that said camera lens can be positioned in close proximity to said mirror or away from said mirror, or any position therebetween so that the amount of magnification is controlled by the position of the camera;

a slide actuator mounted in sliding relation to said housing;

said slide actuator having an internal part connected to said camera lens;

said slide actuator having an external part positioned external to said housing so that a user may control the position of said camera lens by sliding said external part of said slide actuator with respect to said housing;

a slot formed in said housing;

said internal part of said slide actuator being connected to said external part of said slide actuator through said slot;

said light guide having a transparent construction; and said light guide having a vertical part, a horizontal part, and a deflector wall disposed between said vertical and horizontal parts at a substantially forty-five degree angle.

9. The magnifier of claim 8, further comprising:

said light source being in open communication with said vertical part of said light guide;

said deflector wall operative to direct light from said light source into said horizontal part of said light guide.

10. The magnifier of claim 9, further comprising:

said diffuser being disposed between said horizontal part of said light guide and said transparent bottom wall.

* * * * *